Oct. 15, 1929. H. A. DENMIRE 1,731,713
STOCK PICK-UP FOR FABRIC CUTTING MACHINES
Filed May 12, 1927  2 Sheets-Sheet 1

INVENTOR
Harold A. Denmire.
BY Evans & McCoy
ATTORNEYS

Oct. 15, 1929.   H. A. DENMIRE   1,731,713
STOCK PICK-UP FOR FABRIC CUTTING MACHINES
Filed May 12, 1927   2 Sheets-Sheet 2

INVENTOR
Harold A. Denmire.
BY Evans & McCoy
ATTORNEYS

Patented Oct. 15, 1929

1,731,713

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

STOCK PICK-UP FOR FABRIC-CUTTING MACHINES

Application filed May 12, 1927. Serial No. 190,756.

This invention relates to stock pick-up mechanism and particularly to pick-up mechanism for use in connection with rubber surfaced or impregnated fabric and like materials.

Considerable difficulty has heretofore been experienced in picking up and releasing tacky materials such as rubberized fabric and the like. These materials have also been difficult to handle because of their tendency to stick to such objects as come in contact with them.

This difficulty has particularly been experienced in the operation of the general form of the machine for cutting fabric on the bias that is shown and described in detail in my Patents Nos. 1,617,012 and 1,617,013 and an embodiment of the invention in this character of machine will particularly be described as illustrative of one general use of the invention.

In the type of bias cutting machine above referred to, the fabric sometimes adheres to the cutter bar or the cutting head and this causes it to gather under the knife instead of passing over the cutter bar as intended. The cut edge of the fabric may also drop into the cutting groove and, because of its engagement with the far side of the groove, the travel of the fabric may be temporarily arrested which results in erroneous cutting by the machine.

In order to correct the above difficulties the present invention was employed in connection with the above bias cutting machine in order to insure that the fabric would always be picked up by the cutter head and be positively released therefrom by the mechanism herein proposed.

Other embodiments of the invention are also shown to illustrate the general use of the invention in connection with the handling of tacky rubberized materials.

One of the objects of the present invention is to provide means associated with the knife head and stripper plate of a bias cutter for causing the fabric to adhere always to the knife head from which it is then positively released.

An additional object of the invention is to provide means for causing the fabric being cut by a bias cutter to adhere to either the cutter bar or the knife head and means for then positively releasing the fabric.

Another object of the invention is to provide a suitable pick-up mechanism of the character proposed that may be used with any device such as a conveyor belt, cutting unit or assembly unit for positively picking up rubberized fabric or other tacky material and positively releasing the fabric or material at a predetermined interval of time.

An additional object of the invention is to provide in connection with a cutting machine of the character above described, improved pick-up mechanism for handling strips of rubberized fabric, and also to provide a device wherein the degree of adhesion of the fabric is adjustable.

Particular applications of the invention are shown in the accompanying drawing wherein.

Figure 1:
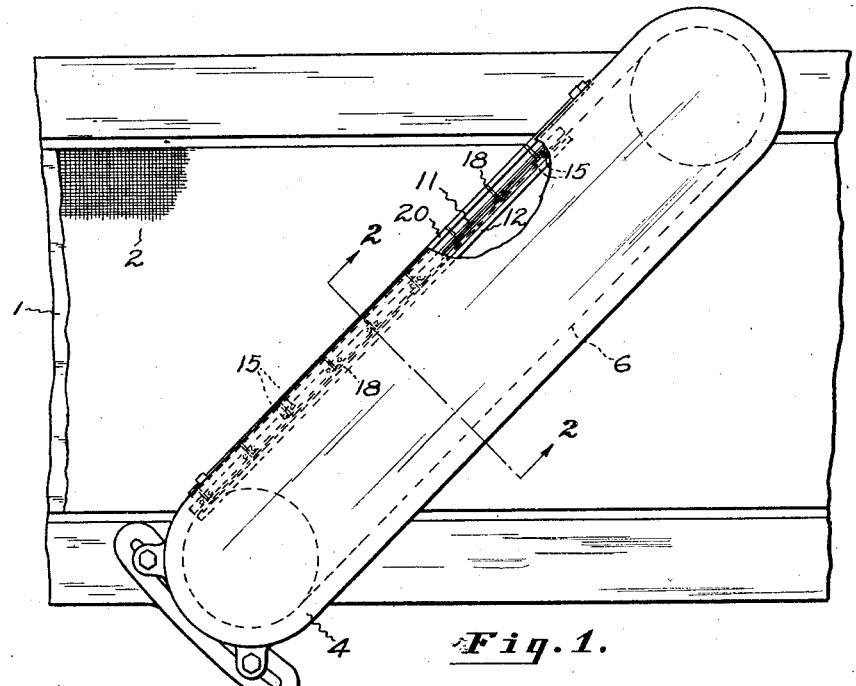
Figure 1 is a diagrammatic plan view of a bias cutter embodying the invention.

In machines for cutting fabric on the bias, in connection with which a preferred embodiment of the invention is illustrated, the fabric, which has previously been given a coating of rubber, is carried on an intermittently operated belt and, at one point of its travel, is led over a cutter bar. Between the feeding movements of the belt the cutter bar having the fabric travelling thereover is elevated to engagement with a series of rapidly travelling knives that sever the fabric to thereby provide strips of predetermined width. The belt is advanced intermittently the required distance and the cutter element, which is in the form of a continuously driven belt having a series of knife blades carried thereby, is mounted in a framework which is supported above the conveyor belt and also above a cutter bar that is positioned between the conveyor belt and the fabric. The elevation of the cutter bar and belt lifts the fabric to engagement with the knives and upon the descent of the cutter bar, the fabric is caused temporarily to adhere to a presser foot of the knife head from which it is subsequently released by a stripper mechanism hereinafter described in detail.

In the drawings, the intermittently operated belt 1 carries the fabric 2 on its conveying face. A cutter bar 3 in the form of a flat strip or plate of steel, aluminum alloy, or other suitable metal with a cutting slot extending longitudinally thereof, overlies the upper surface of the conveyor belt and is held in definite position with respect to the cutter knives. The knife carrying head 4 that supports the cutter knives and associated mechanism is adapted to be moved to different degrees of angularity with respect to the line of travel of the fabric being cut in order that changes may be made in the angularity of the threads of the fabric relative to the strip formed. A suitable channel iron 5 underlies the conveyor belt and the cutter bar and serves to elevate the belt and the cutter bar into operative engagement with the cutting knives during the interval of arrested movement of the conveyor belt.

The knife carrying head 4 embodies an endless belt 6 that carries a plurality of cutting knives 7 the position of which is controlled by the belt guides 8. A corresponding belt guide 9 is mounted in the other arm of the cutter head for the return travel of the knives. A guard 10 is also carried by the return arm of the frame for preventing accidental engagement with the cutting knives.

Figure 2:
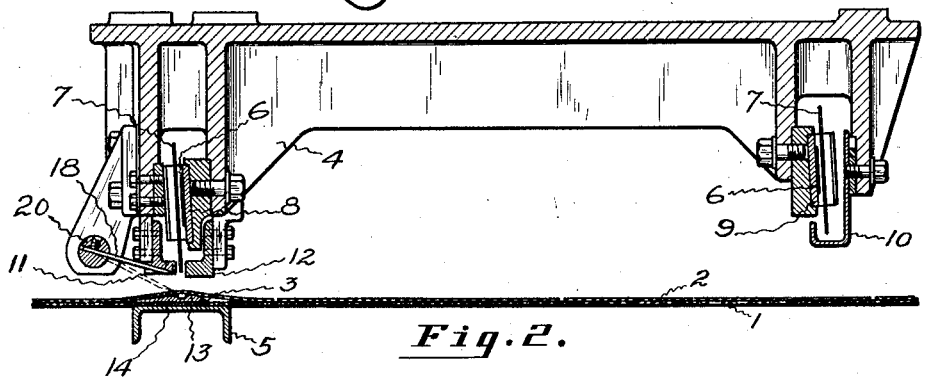
Fig. 2 is an enlarged, transverse, sectional view taken substantially on line 2—2 of Fig. 1, showing in detail the application of the invention to the bias cutter illustrated in Fig. 1.
Figure 3:
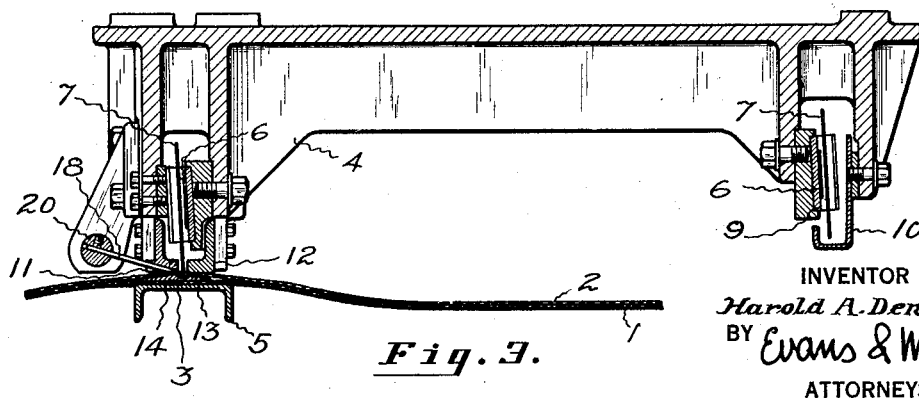
Fig. 3 is a corresponding sectional view of the mechanism of Fig. 2 shown in cutting position.

A pair of presser feet 11 and 12 that are yieldingly held in the position illustrated in Fig. 2 by suitable spring arrangements engage the fabric upon upward movement of the channel 5 that pushes the presser feet back to expose the knives 7 to cause a quick clean cut of the fabric. The respective cooperation of these presser feet 11 and 12 with the lands 13 and 14 of the cutter bar rigidly clamps the fabric in place on each side of the cutting groove. The design of these elements of the machine with the exception of the cutter bar and presser foot 11 are only generally related to the present invention and, therefore, they will not be described herein in detail.

The presser foot 11 and the associated mechanism including the cutter bar incorporates the invention herein presented which embodies a controlled pick-up mechanism for causing the fabric to adhere to the presser foot when it is brought into engagement therewith. It is to this particular portion of the machine that the present invention is applied.

Figure 4:
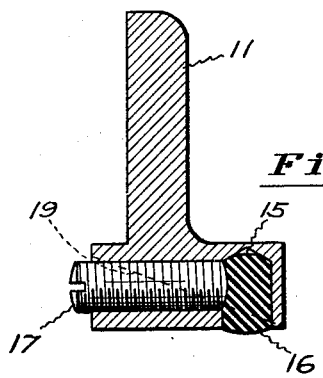
Fig. 4 is an enlarged detail view of one of the stripper bars shown in connection with Figs. 2 and 3 of the drawing.

The presser foot 11 has a series of pockets 15 formed along its inner face as particularly shown in detail in Fig. 4 of the drawings. Each of these pockets has a closely fitting rubber plug 16 secured therein. After the plugs have been mounted in the pockets for receiving them, their exposed ends are buffed off to the surface level of the fabric engaging face of the bar. Suitable adjustment screws 17, each of which is associated with one of the plugs and provided with a rounded head, enter the bar laterally and adjustably engage the sides of the plugs for adjustably pushing the faces of the plugs somewhat beyond the face of the bar as may be desired for the proper degree of adhesion. The position and arrangement of the rubber plugs 16 within the pick-up bar is purely a matter of design for the particular machine and character of material handled thereby. They should be arranged sufficiently close to each other to insure unerring adhesion of the fabric to the pick-up bar during operation of the machine.

A series of stripper fingers 18 that are received in suitable notched out portions 19 of the pick-up bar are controlled by suitable cam movement from a transverse bar 20 that is journaled in the knife carrying head and that extends parallel to the pick-up plate. The bar 20 is operated by the same mechanism that controls movement of the cutter bar in order that the movement will be synchronized and to insure that the fabric will be kicked loose from the pick-up plate at the desired instant after the strip is severed.

The cutter bar has its second land 14 of higher elevation than the other land 13 in order that when the fabric is kicked free from the presser foot 11, it will not be caught within the cutting groove of the cutter bar.

Figure 5:
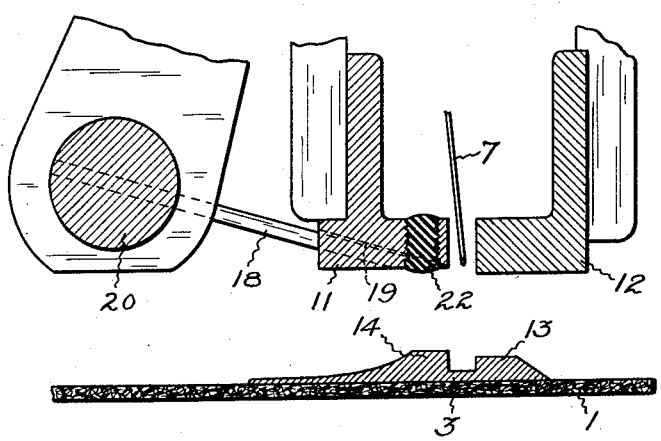
Fig. 5 is a corresponding enlarged detail view of a modification of the invention.

A modification of the invention as applied to the presser foot 11 is shown in Fig. 5 wherein the holes for receiving the rubber plugs 22 are open to the upper face of the pick-up bar and are internally threaded. The rubber plugs 22 in this instance are secured in the cavity by the screw threads and therefore they may be manipulated to bring them the desired adjustable distance beyond the operating face of the bar by turning the same in their respective mountings or by other suitable means.

The operation of the pick-up mechanism when used in combination with the bias cutter illustrated in the drawings is substantially as follows: Periodic advance of the belt 1 feeds a predetermined length of fabric over the cutter bar 3 and under the cutter knife head 4. Movement of the belt is then arrested and, by suitably controlled mechanism, the channel member 5 is raised to thereby lift the conveyor belt, the cutter bar and the fabric to engagement with the presser feet 11 and 12 of the device. These feet are yieldingly mounted and the spring pressure between them and the cutter bar clamps the fabric securely on each side of the position of the cut. As the presser feet are forced back by the cutter bar, the rapidly travelling knives 7 are exposed and the fabric is cut thereby. The channel bar then descends and carries with it the belt and cutter bar. By reason of the adhesion of the tacky elements with the fabric, the fabric adheres to the presser foot 11 upon the return movement of the cutter bar. The bar 20 is then partially rotated which moves the stripper fingers 18 away from the presser foot 11 and forces the fabric away from the presser foot 11. The fabric thus released drops upon the conveyor belt and the cutter bar from which it has been released and it therefore moves freely over the cutter bar to its new position in response to advance movement of the belt.

The modified form of presser foot shown in Fig. 5 operates in the same manner as the presser foot 11 of Fig. 4 and therefore its specific operation will not be further considered.

Figure 6:
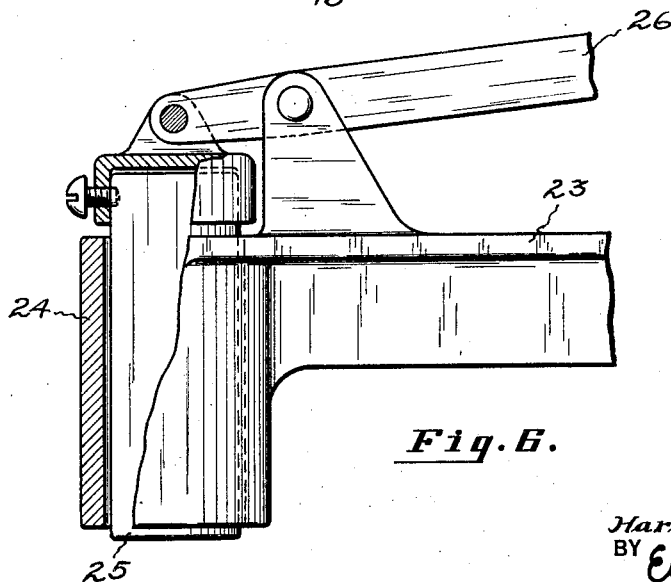
Fig. 6 is a side elevational view shown partially in section of a modified application of the invention to pick-up mechanism.

An additional application of the invention is shown in Fig. 6 of the drawings wherein a pick-up arm 23 that forms a part of any desired machine, is provided at its extremity with a sleeve 24 that has a rubber adhesion plug 25 reciprocatably mounted therein. A suitable trip mechanism 26 that in this device constitutes a pivoted lever having one end connected with the adhesion plug 25 and the other end operated by any suitable device in order that the plug 25 may extend through the sleeve 24 for picking up tacky rubber articles and may be withdrawn into the sleeve by operation of the arm 26 to release the article.

From the two typical applications of the invention it will be seen that the cooperation of a tacky pick-up plug in combination with releasing mechanism constitutes the broad idea of the invention for particular use with tacky rubber materials. Other uses of the invention and the application thereof to other devices will be apparent to those skilled in the art. The present illustration is given solely for the purpose of explanation of the broad idea.

I desire, therefore, that only such limitations be imposed on the invention as are required by the prior art.

What I claim is:

1. A machine of the class described having in combination a movable support for a tacky fabric, a knife, means for bringing the knife into cutting engagement with the fabric, a pick-up member having a face engageable with the fabric adjacent the line of cut, means carried by said member for increasing the adhesion of the fabric to the face of the member, and means for forcibly separating the fabric from said pick-up member.

2. A machine of the class described having in combination a movable support for a tacky fabric, a knife for cutting the fabric, means for bringing the knife into cutting engagement with the fabric, a pick-up member having a face engageable with the fabric adjacent the line of cut, means carried by said member for increasing the adhesion of the fabric to the face of the member, said means being adjustable to vary the adhesion of the fabric to the member, means for forcibly separating the fabric from the said pick-up member after the material has been cut.

3. A machine of the class described having in combination an endless belt for supporting a strip of tacky material, means for moving the belt intermittently, a continuously moving knife, means for moving the material into contact with the knife, a member adjacent the knife with which the material engages, said member having a portion of its material engaging face formed of rubber and means for releasing the material from said member after the cut is completed.

4. The combination with an apparatus for cutting a tacky fabric into strips including a conveyor belt, a band knife acting transversely of the belt, a support for said band knife having a portion engageable with said fabric, a cutter bar overlying the belt, means for bringing the cutter bar and knife into co-operative relation, and rubber inserts carried by the knife support for increasing the adhesion of the fabric to the knife support and means for positively forcing the material away from the knife support.

5. A machine of the class described having in combination, a movable support for a tacky fabric, a continuously moving knife, means for bringing the knife into cutting engagement with the fabric, a pick-up member having a face engageable with the fabric adjacent the line of cut, the fabric engaging face of said pick-up member having rubber inserts therein for increasing the adhesion of the fabric to the face of said member and means for separating the fabric from the said pick-up member after the cut is formed.

6. A machine of the class described having in combination a movable support for a tacky fabric, a knife, means for bringing the knife into cutting relation with the fabric, a support for the knife including a pick-up member having a face engageable with the fabric adjacent the line of cut, the fabric engaging face of said pick-up member having rubber inserts for increasing the adhesion of the fabric thereto, means for adjusting said inserts to vary the adhesion of the fabric to the pick-up member and means for forcibly separating the fabric from the pick-up member after the cut is formed.

In testimony whereof I affix my signature.

HAROLD A. DENMIRE.